: United States Patent (10) Patent No.: US 10,871,406 B2
Koizumi et al. (45) Date of Patent: Dec. 22, 2020

(54) OPTICAL FIBER STRAIN AND TEMPERATURE MEASUREMENT APPARATUS AND OPTICAL FIBER STRAIN AND TEMPERATURE MEASUREMENT METHOD (71) Applicant: Oki Electric Industry Co., Ltd., Tokyo (JP)

(72) Inventors: Kengo Koizumi, Tokyo (JP); Tokuo Yamaguchi, Tokyo (JP); Hitoshi Murai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 336 days.

(21) Appl. No.: 16/031,604

(22) Filed: Jul. 10, 2018

(65) Prior Publication Data
US 2019/0094082 A1 Mar. 28, 2019

(30) Foreign Application Priority Data

Sep. 27, 2017 (JP) ................................ 2017-186058

(51) Int. Cl.
*G01K 11/32* (2006.01)
*G01D 5/353* (2006.01)
(Continued)

(52) U.S. Cl.
CPC ..... *G01K 11/3206* (2013.01); *G01D 5/35332* (2013.01); *G01D 5/35364* (2013.01);
(Continued)

(58) Field of Classification Search
CPC ............ G01D 5/35332; G01D 5/35364; G01J 3/4412; G01K 9/04; G01K 11/32; G01K 2011/322
See application file for complete search history.

(56) References Cited

U.S. PATENT DOCUMENTS 9,983,069 B2 5/2018 Koizumi
2016/0290857 A1* 10/2016 Koizumi ................ G01K 11/32
(Continued)

FOREIGN PATENT DOCUMENTS

CN 106017521 A 10/2016
CN 106153089 A 11/2016
(Continued)

OTHER PUBLICATIONS

T. Kurashima et al., "Brillouin Optical-Fiber Time Domain Reflectometry", IEICE Trans. Commun., vol. E76-B, No. 4, pp. 382-390, Apr. (1993).
(Continued)

*Primary Examiner* — Dominic J Bologna
(74) *Attorney, Agent, or Firm* — Rabin & Berdo, P.C.

(57) ABSTRACT

A self-delayed homodyne interferometer includes light source unit, a splitting unit, an interference signal acquisition unit, a scattered light intensity acquisition unit, and a signal processing unit. The light source unit generates probe light. The splitting unit splits into two branches, Brillouin backscattered light occurring in an optical fiber to be measured with the probe light. The acquisition unit receives scattered light of one branch, and uses a self-delayed homodyne interferometer to generate an interference signal. The acquisition unit receives scattered light of the other branch, and acquires intensity of the scattered light. The signal processing unit separates and acquires a frequency shift amount from the intensity of the interference signal, and strain and temperature change from the intensity of the scattered light. The acquisition unit can change a phase of the scattered light of the one of the two branches.

8 Claims, 6 Drawing Sheets

(51) Int. Cl.
  *G01J 3/44* (2006.01)
  *G01J 9/04* (2006.01)
(52) U.S. Cl.
  CPC .............. *G01J 3/4412* (2013.01); *G01J 9/04* (2013.01); *G01K 11/32* (2013.01); *G01K 2011/322* (2013.01)

(56) References Cited

U.S. PATENT DOCUMENTS

2017/0108358 A1* 4/2017 Bastianini .......... G01D 5/35364
2017/0254708 A1* 9/2017 Koizumi .................. G01D 5/28
2018/0094987 A1* 4/2018 Iwamura ................ G01K 11/32

FOREIGN PATENT DOCUMENTS

JP   2016-191659 A   11/2016
JP   2017-156289 A    9/2017

OTHER PUBLICATIONS

T. R. Parker et al., "Simultaneous Distributed Measurement of Strain and Temperature from Noise-Initiated Brillouin Scattering in Optical Fibers", IEEE J. Quantum Electron., vol. 34, No. 4, pp. 645-659, Apr. (1998).
Y. Sakairi et al., "A system for measuring temperature and strain separately by BOTDR and OTDR", Proceedings of SPIE, vol. 4920, pp. 274-284 (2002).
Li Yong-qian et al., "Scheme Design and Performance Analysis of Coherent Self-Heterodyne Brillouin Fiber Sensing System," vol. 31 No. 3 Jun. 2008.

* cited by examiner

OPTICAL FIBER LENGTH

OPTICAL FIBER STRAIN AND TEMPERATURE MEASUREMENT APPARATUS AND OPTICAL FIBER STRAIN AND TEMPERATURE MEASUREMENT METHOD

CROSS REFERENCE TO RELATED APPLICATION(S)

This application is based upon and claims benefit of priority from Japanese Patent Application No. 2017-186058, filed on Sep. 27, 2017, the entire contents of which are incorporated herein by reference.

BACKGROUND

This invention relates to an optical fiber strain and temperature measurement apparatus and an optical fiber strain and temperature measurement method using Brillouin scattered light.

With the evolution of optical fiber communication, distributed optical fiber sensing, in which the optical fiber itself serves as a sensing medium, has become an active area of research. In particular, different from an electric sensor that performs measurement for each point, optical fiber sensing that uses scattered light is capable of sensing as long-distance distribution. Accordingly, the optical fiber sensing allows the physical quantity of the entire measurement target to be measured.

Representative distributed optical fiber sensing is optical time domain reflectometry (OTDR), in which optical pulses are incident on an optical fiber from one end of the optical fiber, and light backscattered within the optical fiber is measured with respect to time. Backscattering in an optical fiber includes Rayleigh scattering, Brillouin scattering, and Raman scattering. Among others, OTDR that measures spontaneous Brillouin scattering is referred to as Brillouin OTDR (BOTDR) (see, for example, T. Kurashima et al., "Brillouin Optical-fiber time domain reflectometry", IEICE Trans. Commun., vol. E76-B, no. 4, pp. 382-390 (1993)).

Brillouin scattering is observed at positions with the frequency shift of the order of GHz on Stokes and anti-Stokes sides with respect to the center frequency of the optical pulse incident on the optical fiber. The spectrum of Brillouin scattering is referred to as the Brillouin gain spectrum (BGS). The frequency shift and the spectral line width of the BGS are referred to as Brillouin frequency shift (BFS) and Brillouin line width, respectively. The BFS and the Brillouin line width vary depending on the material of the optical fiber and the wavelength of incident light. For example, in the case of a silica-based single-mode optical fiber, it is reported that the magnitude of the BFS and the Brillouin line width for a wavelength of 1.55 µm are approximately 11 GHz and approximately 30 MHz, respectively. In addition, according to T. Kurashima et al., "Brillouin Optical-fiber time domain reflectometry", IEICE Trans. Commun., vol. E76-B, no. 4, pp. 382-390 (1993), the magnitudes of the BFS associated with strain and a temperature change inside a single-mode fiber are 0.049 MHz/µε and 1.0 MHz/° C., respectively, for a wavelength of 1.55 µm.

Here, the BFS has dependency on strain and temperature, and thus BOTDR has been attracting attention because BOTDR is usable for the purpose of monitoring large constructions represented by bridges, tunnels and the like, potential areas of landslide occurrence, or the like.

BOTDR generally performs heterodyne detection to measure the spectrum waveform of spontaneous Brillouin scattered light caused in an optical fiber with the use of reference light prepared separately. The intensity of spontaneous Brillouin scattered light is lower than the intensity of Rayleigh scattered light by two through three orders of magnitude. Therefore, heterodyne detection is also useful in increasing the minimum light reception sensitivity.

Here, even the application of heterodyne detection does not offer a sufficient signal-to-noise ratio (S/N) as spontaneous Brillouin scattered light is very weak. As a result, an averaging process is necessary to improve S/N. A conventional optical fiber strain measurement apparatus that performs BOTDR acquires three-dimensional information of time, amplitude, and frequency. The averaging process and the acquisition of this three-dimensional information, however, make it difficult to shorten measurement time.

For this, there are proposed an optical fiber strain measurement apparatus and an optical fiber strain measurement method that use spontaneous Brillouin scattered light and measure an optical frequency change as a phase difference of a beat signal provided by coherent detection to acquire two-dimensional information of time and a phase (see, for example, JP 2016-191659A).

According to the optical fiber strain measurement apparatus and the optical fiber strain measurement method disclosed in JP 2016-191659A, by using the self-delayed heterodyne BOTDR (SDH-BOTDR) technology, an optical frequency change is measured as a phase difference of a beat signal provided by coherent detection, thereby acquiring two-dimensional information with time and a phase. As this SDH-BOTDR requests no frequency sweep, measurement time is shortened as compared to the prior art which requests three-dimensional information to be acquired.

Here, not limited to BOTDR, distributed optical fiber sensing using Brillouin scattering undergoes BFSs in both strain and temperature as described above. Accordingly, it is an essential problem to discriminate between strain and temperature. For this problem, there is proposed a method that uses a strain dependence coefficient and a temperature dependence coefficient of a Brillouin backscattering coefficient in an optical fiber (see, for example, T. R. Parker et al., "Simultaneous distributed measurement of strain and temperature from noise-initiated Brillouin scattering in optical fibers", IEEE J. Quantum Electron., vol. 34, No. 4, pp. 645-659 (1998), or Y. Sakairi et al., "A system for measuring temperature and strain separately by BOTDR and OTDR", Proceedings of SPIE, vol. 4920, pp. 274-284 (2002)).

In SDH-BOTDR, as technology of discriminating between strain and temperature, there are also proposed an optical fiber strain and temperature measurement apparatus and an optical fiber strain and temperature measurement method (see, for example, JP 2017-156289A)

SUMMARY

Here, a signal-to-noise ratio (S/N) improvement effect of 3 dB can be expected from measurement with a homodyne interferometer as compared with measurement with a heterodyne interferometer disclosed in JP 2017-156289A or the like. In addition, the homodyne interferometer can also reduce devices such as a frequency shifter, and is effective in miniaturizing the apparatus and reducing the cost.

The signals output from the homodyne interferometer are, however, direct-current (DC) components, and a frequency change of a BFS is directly observed as an intensity change. Therefore, the homodyne interferometer cannot acquire intensity information of Brillouin scattered light itself. Thus, the optical fiber strain and temperature measurement apparatus and the optical fiber strain and temperature measurement method disclosed in JP 2017-156289A are technology that is effective for a heterodyne interferometer, but inapplicable to a homodyne interferometer.

This invention has been devised in view of the problem described above. An object of this invention is to provide an optical fiber strain and temperature measurement apparatus and an optical fiber strain and temperature measurement method that can separate and acquire strain and a temperature change in BOTDR using a homodyne interferometer.

To achieve the object described above, the optical fiber strain and temperature measurement apparatus according to this invention includes a light source unit, a splitting unit, an interference signal acquisition unit, a scattered light intensity acquisition unit, and a signal processing unit.

The light source unit generates probe light. The splitting unit splits Brillouin backscattered light into two branches, the Brillouin backscattered light occurring in an optical fiber to be measured with the probe light. The interference signal acquisition unit receives scattered light of one of the two branches split by the splitting unit, and uses self-delayed homodyne interferometer to generate an interference signal. The scattered light intensity acquisition unit receives scattered light of another of the two branches split by the splitting unit, and acquires intensity of the scattered light. The signal processing unit separates and acquires a frequency shift amount acquired from intensity of the interference signal, and strain $\delta\varepsilon$ and a temperature change $\delta T$ from the intensity of the scattered light. Here, the interference signal acquisition unit is capable of changing a phase of the scattered light of the one of the two branches.

According to a preferable embodiment of this optical fiber strain and temperature measurement apparatus, the signal processing unit acquires the strain $\delta\varepsilon$ and the temperature change $\delta T$ in an optical fiber by solving following simultaneous equations (1) with two unknowns from the frequency shift amount $\delta v$ and the intensity $\delta P_B/P_B$, a strain dependence coefficient $C_{v\varepsilon}$ and a temperature dependence coefficient $C_{vT}$ of a frequency shift of Brillouin backscattering, and a strain dependence coefficient $C_{P\varepsilon}$, and a temperature dependence coefficient $C_{PT}$ of a scattering coefficient of the Brillouin backscattering in the optical fiber, the strain dependence coefficient $C_{v\varepsilon}$, the temperature dependence coefficient $C_{vT}$, the strain dependence coefficient $C_{P\varepsilon}$, and the temperature dependence coefficient $C_{PT}$ being obtained in advance. The transmission loss in the measurement target fiber is, however, negligible.

$$\delta v = (C_{v\varepsilon}\delta\varepsilon + C_{vT}\delta T)\left(1 + \frac{C_{P\varepsilon}\delta\varepsilon + C_{PT}\delta T}{100}\right)^2 \quad (1)$$

$$100\frac{\delta P_B}{P_B} = C_{P\varepsilon}\delta\varepsilon + C_{PT}\delta T$$

In addition, the optical fiber strain and temperature measurement method according to this invention includes the following steps.

First, probe light is generated. Next, Brillouin backscattered light is split into two branches, the Brillouin backscattered light occurring in an optical fiber to be measured with the probe light. Next, scattered light of one of the two branches is split into two branches of a first light path and a second light path. After delay is provided to scattered light propagating through the first light path, the scattered light propagating through the first light path and scattered light propagating through the second light path are multiplexed to generate interfering light. Next, photoelectric conversion is performed on the interfering light to generate an interference signal that is an electrical signal. A frequency shift amount is acquired from intensity of the interference signal. In addition, scattered light intensity is acquired from scattered light of another of the two branches into which the Brillouin backscattered light is split. Next, strain $\delta\varepsilon$ and a temperature change $\delta T$ are separated and acquired from the frequency shift amount and the scattered light intensity.

To execute this optical fiber strain and temperature measurement method, preferably, the strain $\delta\varepsilon$ and the temperature change $\delta T$ are acquired by solving the simultaneous equations (1) with two unknowns from the frequency shift amount $\delta v$ and the intensity $\delta P_B/P_B$, a strain dependence coefficient $C_{v\varepsilon}$ and a temperature dependence coefficient $C_{vT}$ of a frequency shift of Brillouin backscattering, and a strain dependence coefficient $C_{P\varepsilon}$ and a temperature dependence coefficient $C_{PT}$ of a scattering coefficient of the Brillouin backscattering in the optical fiber, the strain dependence coefficient $C_{v\varepsilon}$, the temperature dependence coefficient $C_{vT}$, the strain dependence coefficient $C_{P\varepsilon}$, and the temperature dependence coefficient $C_{PT}$ being obtained in advance.

The optical fiber strain and temperature measurement apparatus and the optical fiber strain and temperature measurement method according to this invention use a homodyne interferometer to measure an optical frequency change as a phase difference, thereby acquiring two-dimensional information of time and a phase. Therefore, the measurement time is shortened as compared to the prior art which requests three-dimensional information to be acquired. In addition, it is possible to separate and acquire strain and a temperature change from a frequency shift amount and scattered light intensity.

In addition, the use of a homodyne interferometer can be expected to improve S/N as compared with the use of a heterodyne interferometer.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

With reference to the drawings, the following describes an embodiment of this invention, but each figure is merely illustrated so schematically that this invention can be understood. In addition, the following describes a preferable configuration example of this invention, but it is just a preferable example. Thus, this invention is not limited to the following embodiments. A large number of changes or modifications that can attain the advantageous effects of this invention can be made without departing from the configuration scope of this invention.

(Principle)

First, the strain and temperature measurement principle according to this invention will be simply described.

It is reported that not only a frequency shift, but the scattering coefficient thereof also have temperature dependency and strain dependency in Brillouin backscattering. If the strain dependence coefficient and the temperature dependence coefficient of a BFS are respectively set as $C_{v\varepsilon}$ and $C_{vT}$, the strain dependence coefficient and the temperature dependence coefficient of a Brillouin scattering coefficient are respectively set as $C_{P\varepsilon}$ and $C_{PT}$, and these coefficients are measured in advance, the strain and the temperature can be separated by solving the following simultaneous equations (a) with two unknowns.

$$\delta v_B = C_{v\varepsilon}\delta\varepsilon + C_{vT}\delta T \qquad (a)$$

$$100\frac{\delta P_B}{P_B} = C_{P\varepsilon}\delta\varepsilon + C_{PT}\delta T$$

Here, $\delta v_B$ represents the magnitude of the BFS, and $\delta P_B/P_B$ represents a relative change in Brillouin scattering intensity. These $\delta_{vB}$ and $\delta P_B/P_B$ are values measured in BOTDR. In addition, $\delta\varepsilon$ and $\delta T$ respectively represent the strain and temperature change amounts.

The use of a self-delayed homodyne interferometer, however, causes an intensity change associated with a change in the Brillouin scattering coefficient to be captured as a phase difference in addition to a phase difference caused by a BFS similarly to the use of a self-delayed heterodyne interferometer. In other words, a change due to strain and a temperature change of the Brillouin scattering coefficient in addition to the strain dependence coefficient $C_{v\varepsilon}$ and the temperature dependence coefficient $C_{vT}$ of the BFS are superimposed on a frequency shift observed by a homodyne interferometer. Therefore, the simultaneous equations (a) with two unknowns become the equations (1) above.

It is possible to acquire $\delta\varepsilon$ and $\delta T$ by solving the simultaneous equations (1) with two unknowns described above with $\delta v_B$ and $\delta P_B/P_B$ obtained from an interference signal of a homodyne interferometer and each coefficient acquired in advance.

If the simultaneous equations (1) with two unknowns described above are solved, $\delta\varepsilon$ and $\delta T$ are respectively obtained in accordance with the following equations (2).

$$\delta\varepsilon = \frac{C_{PT}\delta v_{SDH} - 100C_{vT}\frac{\delta P_B}{P_B}\left(1+\frac{\delta P_B}{P_B}\right)^2}{(C_{v\varepsilon}C_{PT} - C_{vT}C_{P\varepsilon})\left(1+\frac{\delta P_B}{P_B}\right)^2} \qquad (2)$$

-continued $$\delta T = \frac{-C_{P\varepsilon}\delta v_{SDH} + 100C_{v\varepsilon}\frac{\delta P_B}{P_B}\left(1+\frac{\delta P_B}{P_B}\right)^2}{(C_{v\varepsilon}C_{PT} - C_{vT}C_{P\varepsilon})\left(1+\frac{\delta P_B}{P_B}\right)^2}$$

(Configuration Example)

Figure 1:
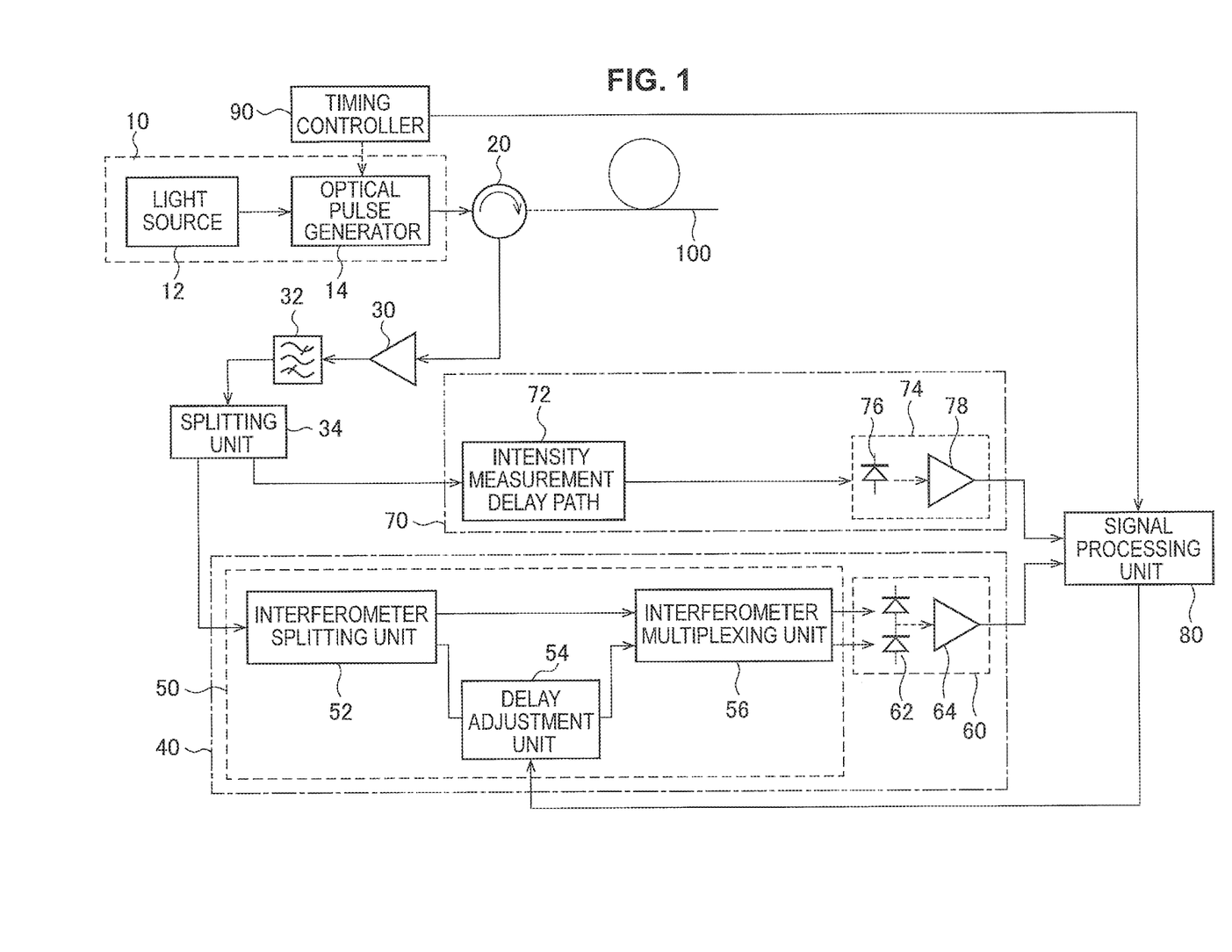
FIG. 1 is a schematic block diagram illustrating a basic configuration of an optical fiber strain and temperature measurement apparatus.

With reference to FIG. 1, an optical fiber strain and temperature measurement apparatus according to this invention will be described. FIG. 1 is a schematic diagram illustrating a configuration example of the optical fiber strain and temperature measurement apparatus (which will also be referred to simply as measurement apparatus) according to this invention.

The measurement apparatus includes a light source unit 10, an optical circulator 20, an optical amplifier 30, an optical bandpass filter 32, a splitting unit 34, an interference signal acquisition unit 40, a scattered light intensity acquisition unit 70, a signal processing unit 80, and a timing controller 90.

The light source unit 10 generates probe light. The light source unit 10 includes a light source 12 configured to generate continuous light and an optical pulse generator 14 configured to generate an optical pulse from the continuous light.

Here, the measurement apparatus measures the phase difference corresponding to a frequency change. Therefore, a frequency fluctuation and frequency spectral line width (which will also be referred to simply as line width) of the light source 12 have to be sufficiently smaller than the Brillouin shift. A frequency stabilized narrow line width light source is then used as the light source 12. For example, the Brillouin shift corresponds to 4 MHz when an optical fiber (which will also be referred to as measurement target optical fiber) 100 that serves as a measurement target has a strain of 0.008%. Therefore, to measure a strain of approximately 0.008%, it is preferable that the frequency fluctuation and the line width of the light source 12 be sufficiently smaller than 4 MHz, more preferably, tens of kHz or less. Note that a narrow line width laser that has a frequency fluctuation and a line width of approximately tens of kHz or less is commercially available as a ready-made product.

The optical pulse generator 14 includes any preferable acousto-optic (AO) modulator or electric optical (EO) modulator that has been well known. The optical pulse generator 14 generates optical pulses from continuous light in accordance with electrical pulses generated by the timing controller 90. The repetition period of the optical pulses is set longer than the round trip time for an optical pulse along the measurement target optical fiber 100. The optical pulses are output as the probe light from the light source unit 10.

This probe light output from the light source unit 10 is incident on the measurement target optical fiber 100 via the optical circulator 20. Note that an optical coupler may be used instead of the optical circulator 20.

The backscattered light from the measurement target optical fiber 100 is sent to the optical amplifier 30 including, for example, an erbium-doped optical fiber amplifier (EDFA) and the like via the optical circulator 20. The backscattered light amplified by the optical amplifier 30 is sent to the optical bandpass filter 32. The optical bandpass filter 32 has a passband of approximately 10 GHz and transmits only spontaneous Brillouin scattered light of the backscattered light. This spontaneous Brillouin scattered light is sent to the splitting unit 34.

The splitting unit 34 splits the spontaneous Brillouin scattered light into two branches. The splitting unit 34 sends one of the two branches to the interference signal acquisition unit 40, and sends the other to the scattered light intensity acquisition unit 70.

The interference signal acquisition unit 40 includes a self-delayed homodyne interferometer 50 and an interfering light reception unit 60.

The self-delayed homodyne interferometer 50 includes an interferometer splitting unit 52, a delay adjustment unit 54, and an interferometer multiplexing unit 56. The spontaneous Brillouin scattered light sent to the homodyne interferometer 50 is split by the interferometer splitting unit 52 into the two branches of a first light path and a second light path. The first light path is provided with the delay adjustment unit 54. The light sent to the first light path is sent to the interferometer multiplexing unit 56 via the delay adjustment unit 54. The light as sent to the second light path is sent to the interferometer multiplexing unit 56.

The interferometer multiplexing unit 56 multiplexes the light received via the first light path and the light received via the second light path to generate interfering light, and sends this interfering light to the interfering light reception unit 60.

The interfering light reception unit 60 includes a balanced photodiode (PD) 62 and an FET amplifier 64. The interfering light is converted by the balanced PD 62 into an electrical signal, and then amplified by the FET amplifier 64. The amplified electrical signal is sent to the signal processing unit 80.

The scattered light intensity acquisition unit 70 includes an intensity measurement delay path 72 and a scattered light reception unit 74. The scattered light split by the splitting unit 34 into two branches and sent to the scattered light intensity acquisition unit 70 is subjected to predetermined delay in the intensity measurement delay path 72, and then sent to the scattered light reception unit 74. The scattered light reception unit 74 includes, for example, a PD 76 and an FET amplifier 78. The scattered light is converted by the PD 76 into an electrical signal, and then amplified by the FET amplifier 78. The amplified electrical signal is sent to the signal processing unit 80.

The signal processing unit 80 acquires δε and δT by solving the simultaneous equations (1) with two unknowns described above.

Figure 2:
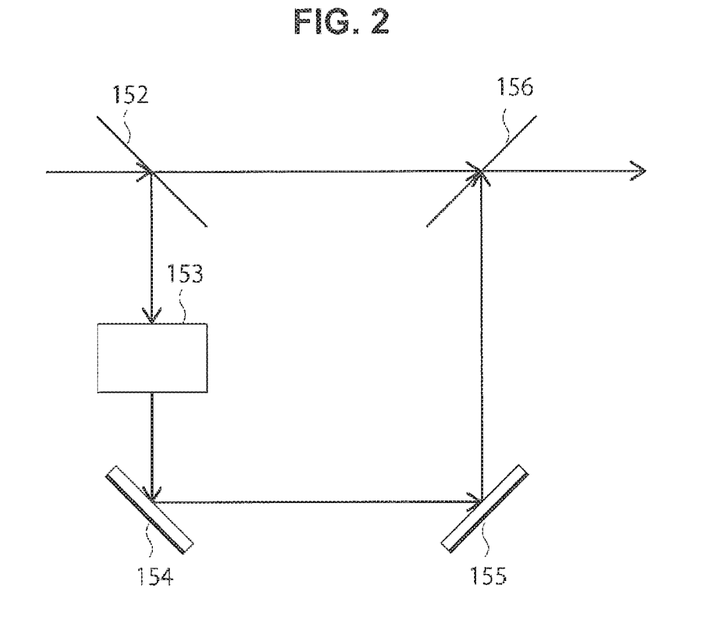
FIG. 2 is a schematic diagram of a homodyne interferometer.

Here, to prevent the influence exerted by a polarization fluctuation, the self-delayed homodyne interferometer preferably includes a so-called space coupling system. FIG. 2 is a schematic diagram of a self-delayed homodyne interferometer including a space coupling system.

The self-delayed homodyne interferometer 50 includes, for example, first and second half mirrors 152 and 156, first and second mirrors 154 and 155, and a phase control element 153.

The first half mirror 152, the first mirror 154, the second mirror 155, and the second half mirror 156 are disposed, for example, at the vertexes of a rectangle. Light input into the first half mirror 152 is split into two branches by the first half mirror 152. One of the two branches is sent to the second half mirror 156, and the other is sent to the second half mirror 156 via the first mirror 154 and the second mirror 155. Light input into the second half mirror 156 is sent to the interfering light reception unit 60.

In addition, the phase control element 153 is provided on the light path connecting the first half mirror 152, the first mirror 154, the second mirror 155, and the second half mirror 156.

In this case, the first half mirror 152 functions as the interferometer splitting unit 52, and the second half mirror 156 functions as the interferometer multiplexing unit 56. In addition, the first mirror 154, the second mirror 155, and the phase control element 153 function as the delay adjustment unit 54.

When the side connecting the first half mirror 152 and the second half mirror 156 serves as a first side and the side connecting the first mirror 154 and the second mirror 155 serves as a second side, moving the second side in the direction orthogonal to the first side changes the light path length or the delay amount of the light propagating through the first light path. In addition, the phase control element 153 changes a phase or a minute delay amount, for example, with an electrical signal from the signal processing unit 80.

Figure 3A:
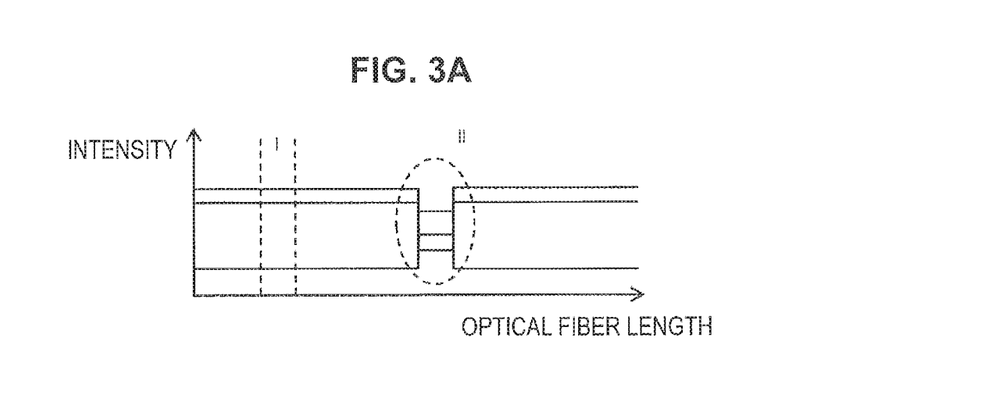
FIG. 3A is a schematic diagram for describing normalization performed in the optical fiber strain and temperature measurement apparatus.

Here, a signal after homodyne detection is a DC signal, and an initial phase serving as a criterion for a phase change amount is unknown. Therefore, the magnitude or change direction of the intensity of a section having a BFS (section represented by II in FIG. 3A) with respect to the intensity of a reference section having no BFS (section represented by I in FIG. 3A) is not decided. Thus, to calculate a frequency shift amount, a normalization process is necessary. This normalization process is performed, for example, as follows.

First, the voltage of the phase control element 153 is changed such that the phase sweeps from 0 to 2n. The average intensity of the reference section having no BFS is measured, and the minimum value (Min) and maximum value (Max) of the average intensity are acquired (see FIG. 3B).

Figure 3B:
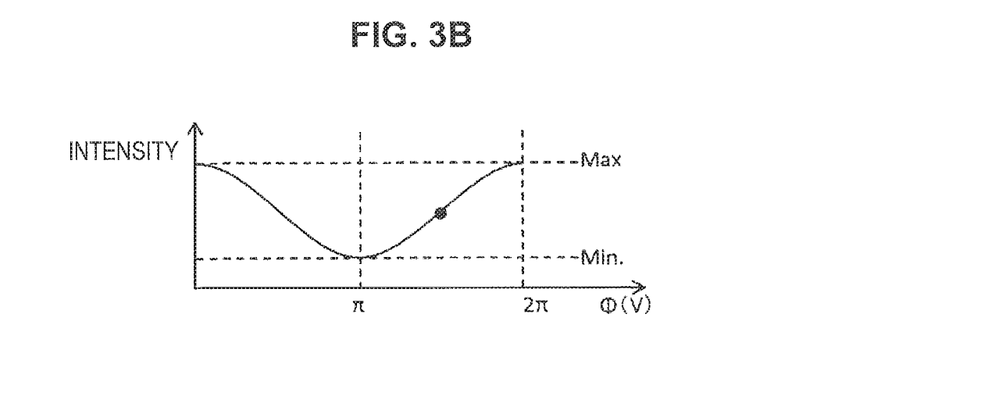
FIG. 3B is a schematic diagram for describing normalization performed in the optical fiber strain and temperature measurement apparatus.
Figure 3C:
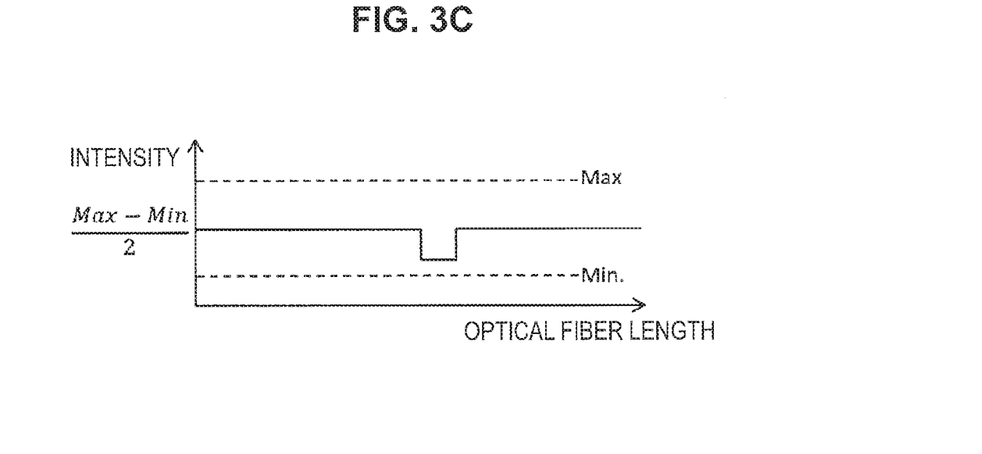
FIG. 3C is a schematic diagram for describing normalization performed in the optical fiber strain and temperature measurement apparatus.

Next, the voltage to be applied to the phase control element 153 is adjusted such that the average intensity of the reference section has the mean value (Mid=(Max+Min)/2) between the acquired minimum value and maximum value.

Intensity P of the section having a BFS is normalized according to the following equation.

$$P_n = (I - Mid)/(Max - Min)$$

$P_n$ represents the normalized intensity. It is possible to obtain the frequency shift amount of the BFS from this normalized intensity $P_n$.

Here, the absolute value of $P_n$ represents the magnitude of the frequency shift caused by strain or a temperature change. In addition, the sign of $P_n$ shows whether the strain has a compression direction or a tensile direction, or whether the temperature change has a rising direction or a lowering direction.

In addition, the average intensity of the reference section is set as a mean value here, but is not limited thereto. As the average intensity, any preferable value between the minimum value and the maximum value can be set.

For example, if as the average intensity of the reference section, a mean value is set with a temperature change in focus and it is possible to measure a temperature change within a range of −250° C. to +250° C., setting a lower value than the mean value as the average intensity of the reference section allows, for example, a temperature change within a range of −100° C. to +400° C. to be set and measured. In addition, Max−Min corresponds to a temperature range of 500° C.

With reference to FIGS. 4 to 8, a frequency shift caused by providing a strain change and a temperature change to an optical fiber will be described.

Figure 4:
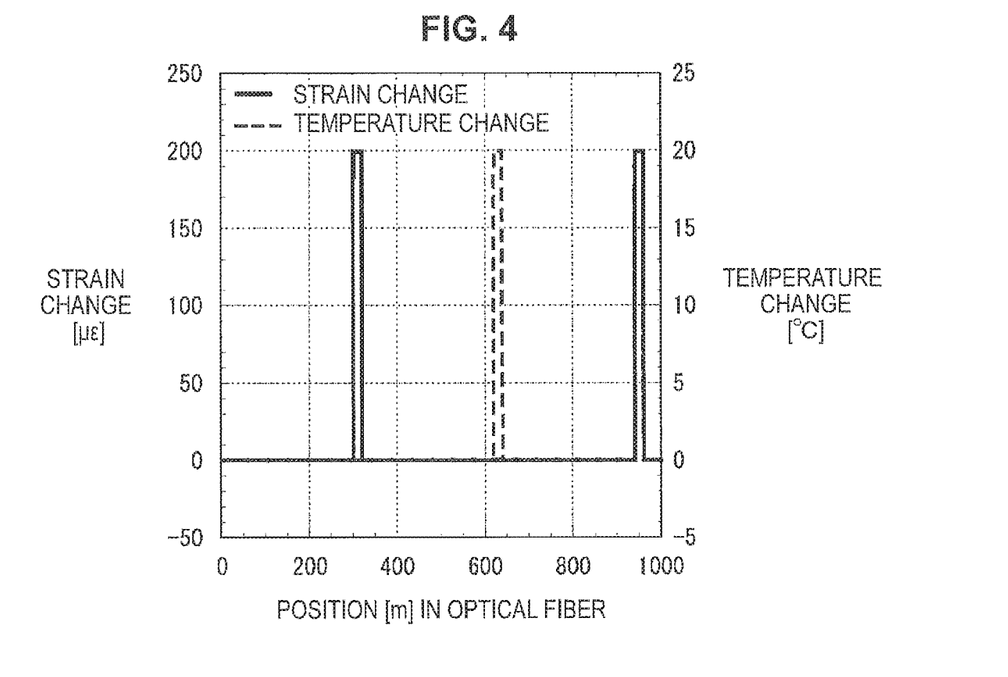
FIG. 4 is a diagram illustrating a strain change and a temperature change provided to an optical fiber.

FIG. 4 is a diagram illustrating a strain change and a temperature change provided to an optical fiber. FIG. 4 plots a position [unit: m] in the optical fiber on the horizontal axis and a strain change [unit: με] and a temperature change

[unit: ° C.] on the vertical axis. Here, the case will be described where the optical fiber has a length of 1 km, a strain of 200με is provided to the section at a distance of 300 to 320 m and the section at a distance of 940 to 960 m from the end of the optical fiber strain and temperature measurement apparatus side, and a temperature change of 20° C. is provided to the section at a distance of 620 to 640 m and the section at a distance of 940 to 960 m from the end.

Here, it is assumed that the strain dependence coefficient $C_{νε}$ of the BFS is 0.049 MHz/με, and the temperature dependence coefficient $C_{νT}$ of the BFS is 1.0 MHz/° C. In addition, the strain dependence coefficient $C_{Pε}$ of the Brillouin scattering coefficient is −7.7×10-4%/° C., and the temperature dependence coefficient $C_{PT}$ of the Brillouin scattering coefficient is 0.36%/° C.

Figure 5:
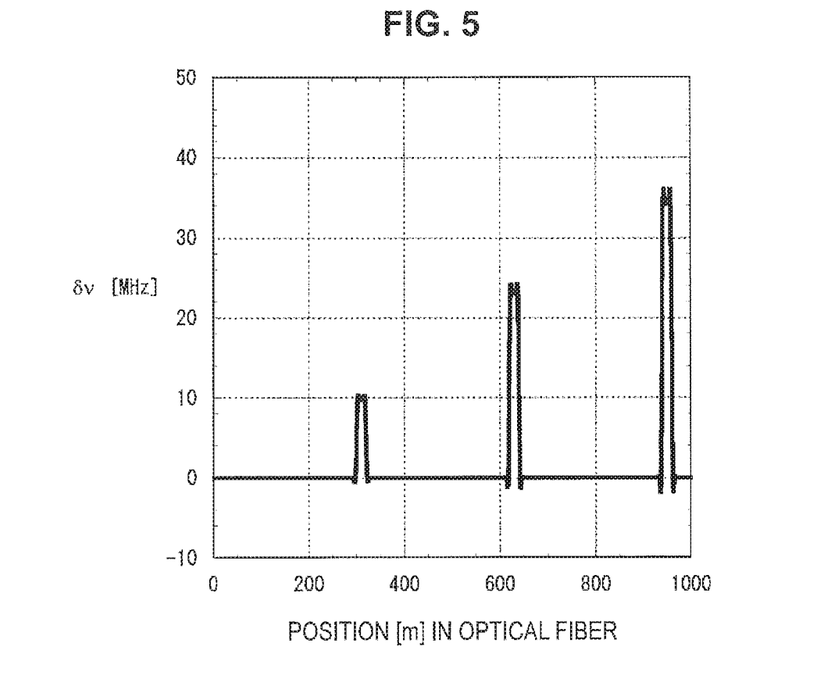
FIG. 5 is a diagram illustrating a frequency shift amount obtained through homodyne interference.

FIG. 5 is a diagram illustrating the frequency shift amount δν obtained by performing homodyne detection. FIG. 5 plots a position [unit: m] in the optical fiber on the horizontal axis and the frequency shift amount δν [unit: MHz] on the vertical axis.

Figure 6:
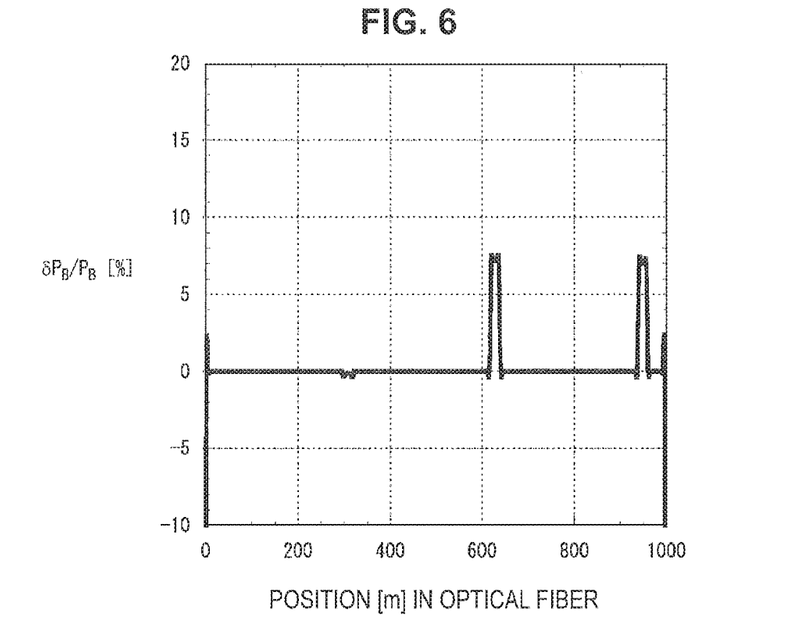
FIG. 6 is a diagram illustrating $\delta P_B/P_B$.

FIG. 6 is a diagram illustrating $δP_B/P_B$ acquired by the scattered light intensity acquisition unit 70. FIG. 6 plots a position [unit: m] in the optical fiber on the horizontal axis and $δP_B/P_B$ [unit: %] on the vertical axis.

The signal processing unit 80 acquires δE and δT by solving the simultaneous equations (1) with two unknowns described above with δν obtained from the interference signal acquisition unit 40, $δP_B/P_B$ obtained from the scattered light intensity acquisition unit 70, and each coefficient acquired in advance.

The strain δE and the temperature change δT are separated and obtained from δν illustrated in FIG. 5 and $P_B/P_B$ illustrated in FIG. 6 in accordance with the equations (2) described above.

Figure 7:
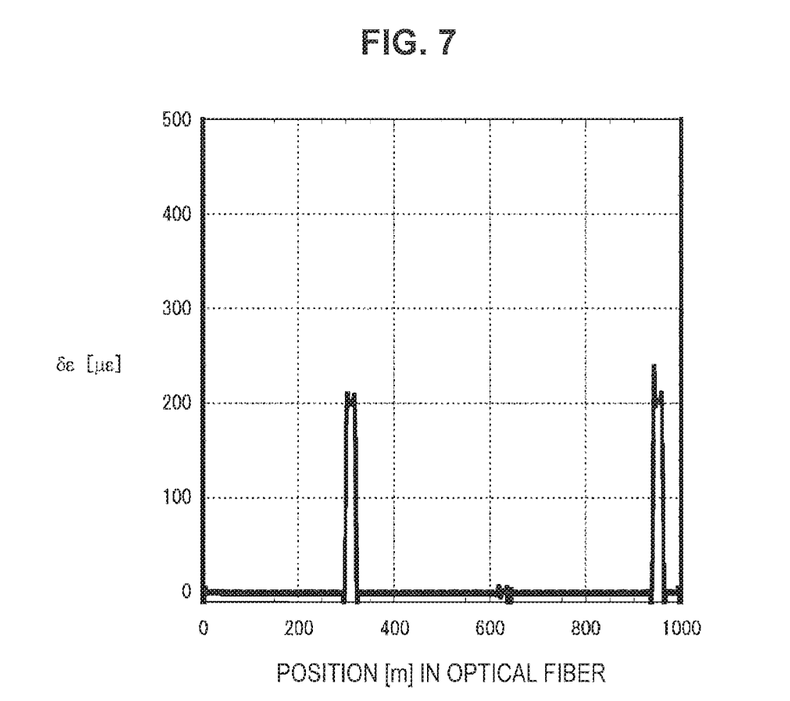
FIG. 7 is a diagram illustrating separated $\delta\varepsilon$.
Figure 8:
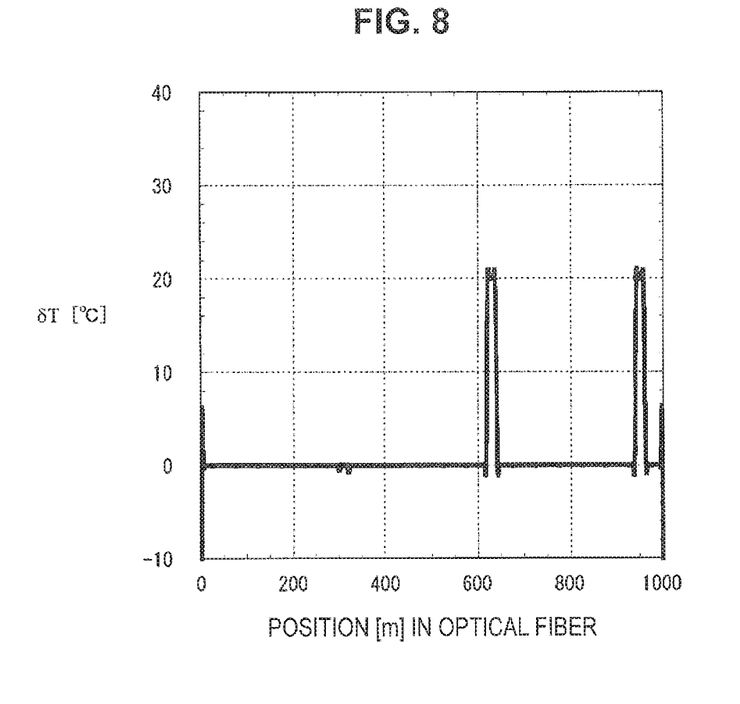
FIG. 8 is a diagram illustrating separated $\delta T$.

FIG. 7 is a diagram illustrating separated δε. FIG. 7 plots a position [unit: m] in the optical fiber on the horizontal axis and δε [unit: με] on the vertical axis. In addition, FIG. 8 is a diagram illustrating separated δT. FIG. 8 plots a position [unit: m] in the optical fiber on the horizontal axis and δT [° C.] on the vertical axis.

As described above, the measurement apparatus and the measurement method that uses a self-delayed homodyne interferometer allow δε and δT to be separated and acquired.

Heretofore, preferred embodiments of the present invention have been described in detail with reference to the appended drawings, but the present invention is not limited thereto. It should be understood that they will naturally come under the technical scope of the present invention.

What is claimed is:

1. An optical fiber strain and temperature measurement apparatus comprising:
   a light source unit configured to generate probe light;
   a splitting unit configured to split Brillouin backscattered light into two branches, the Brillouin backscattered light occurring in an optical fiber to be measured with the probe light;
   an interference signal acquisition unit configured to receive scattered light of one of the two branches split by the splitting unit, and use self-delayed homodyne interferometer to generate an interference signal;
   a scattered light intensity acquisition unit configured to receive scattered light of another of the two branches split by the splitting unit, and acquire intensity of the scattered light; and
   a signal processing unit configured to separate and acquire a frequency shift amount acquired from intensity of the interference signal, and strain δε and a temperature change δT from the intensity of the scattered light, wherein
   the interference signal acquisition unit is capable of changing a phase of the scattered light of the one of the two branches.

2. The optical fiber strain and temperature measurement apparatus according to claim 1, wherein
   the signal processing unit acquires the strain δε and the temperature change δT in an optical fiber by solving following simultaneous equations (1) with two unknowns from the frequency shift amount δν and the intensity $δP_B/P_B$, a strain dependence coefficient $C_{νε}$ and a temperature dependence coefficient $C_{νT}$ of a frequency shift of Brillouin backscattering, and a strain dependence coefficient $C_{Pε}$ and a temperature dependence coefficient $C_{PT}$ of a scattering coefficient of the Brillouin backscattering in the optical fiber, the strain dependence coefficient $C_{νε}$, the temperature dependence coefficient $C_{νT}$, the strain dependence coefficient $C_{Pε}$, and the temperature dependence coefficient $C_{PT}$ being obtained in advance $$\delta v = (C_{v\varepsilon}\delta\varepsilon + C_{vT}\delta T)\left(1 + \frac{C_{P\varepsilon}\delta\varepsilon + C_{PT}\delta T}{100}\right)^2 \quad (1)$$

$$100\frac{\delta P_B}{P_B} = C_{P\varepsilon}\delta\varepsilon + C_{PT}\delta T.$$

3. The optical fiber strain and temperature measurement apparatus according to claim 1, wherein
   the interference signal acquisition unit includes
      a self-delayed homodyne interferometer including
         an interferometer splitting unit configured to split the received scattered light into two branches of a first light path and a second light path,
         a delay adjustment unit provided in the first light path, and capable of changing the phase of the scattered light in accordance with an instruction from the signal processing unit, and
         an interferometer multiplexing unit configured to multiplex light received via the first light path and light received via the second light path to generate interfering light, and
      an interfering light reception unit configured to convert the interfering light into an electrical signal to generate an interference signal.

4. The optical fiber strain and temperature measurement apparatus according to claim 3, wherein
   the self-delayed homodyne interferometer includes a space coupling system.

5. An optical fiber strain and temperature measurement method comprising:
   generating probe light;
   splitting Brillouin backscattered light into two branches, the Brillouin backscattered light occurring in an optical fiber to be measured with the probe light;
   splitting scattered light of one of the two branches into two branches of a first light path and a second light path;
   providing delay to scattered light propagating through the first light path;
   multiplexing the scattered light propagating through the first light path and scattered light propagating through the second light path to generate interfering light;

performing photoelectric conversion on the interfering light to generate an interference signal that is an electrical signal;

acquiring a frequency shift amount from intensity of the interference signal;

acquiring scattered light intensity from scattered light of another of the two branches into which the Brillouin backscattered light is split; and separating and acquiring strain $\delta\varepsilon$ and a temperature change $\delta T$ from the frequency shift amount and the scattered light intensity.

6. The optical fiber strain and temperature measurement method according to claim 5, wherein the strain $\delta\varepsilon$ and the temperature change $\delta T$ in an optical fiber are acquired by solving following simultaneous equations (1) with two unknowns from the frequency shift amount $\delta v$ and the intensity $\delta P_B/P_B$, a strain dependence coefficient $C_{v\varepsilon}$ and a temperature dependence coefficient $C_{vT}$ of a frequency shift of Brillouin backscattering, and a strain dependence coefficient $C_{P\varepsilon}$ and a temperature dependence coefficient $C_{PT}$ of a scattering coefficient of the Brillouin backscattering in the optical fiber, the strain dependence coefficient $C_{v\varepsilon}$, the temperature dependence coefficient $C_{vT}$, the strain dependence coefficient $C_{P\varepsilon}$, and the temperature dependence coefficient $C_{PT}$ being obtained in advance $$\delta v = (C_{v\varepsilon}\delta\varepsilon + C_{vT}\delta T)\left(1 + \frac{C_{P\varepsilon}\delta\varepsilon + C_{PT}\delta T}{100}\right)^2 \quad (1)$$

$$100\frac{\delta P_B}{P_B} = C_{P\varepsilon}\delta\varepsilon + C_{PT}\delta T.$$

7. The optical fiber strain and temperature measurement method according to claim 6, further comprising:

changing a phase of the scattered light propagating through the first light path such that the phase sweeps from 0 to 2n, and measuring average intensity of a reference section having no Brillouin frequency shift in each phase;

acquiring a minimum value and a maximum value of the average intensity; and setting the phase of the light propagating through the first light path such that the average intensity reaches a criterion value between the minimum value and the maximum value, wherein in the acquiring the frequency shift amount, the intensity of the interference signal is normalized with the minimum value and the maximum value.

8. The optical fiber strain and temperature measurement method according to claim 5, further comprising:

changing a phase of the scattered light propagating through the first light path such that the phase sweeps from 0 to 2n, and measuring average intensity of a reference section having no Brillouin frequency shift in each phase;

acquiring a minimum value and a maximum value of the average intensity; and setting the phase of the light propagating through the first light path such that the average intensity reaches a criterion value between the minimum value and the maximum value, wherein in the acquiring the frequency shift amount, the intensity of the interference signal is normalized with the minimum value and the maximum value.

* * * * *